United States Patent [19]
Delisle et al.

[11] Patent Number: 5,692,076
[45] Date of Patent: Nov. 25, 1997

[54] ANTIRESONANT WAVEGUIDE APPARATUS FOR PERIODICALLY SELECTING A SERIES OF AT LEAST ONE OPTICAL WAVELENGTH FROM AN INCOMING LIGHT SIGNAL

[75] Inventors: Vincent Delisle, Grenoble Cédex, France; Michel A. Duguay, Ste-Foy, Canada; Udo Trutschel, Brockline, Mass.

[73] Assignee: Université Laval, Québec, Canada

[21] Appl. No.: 570,891

[22] Filed: Dec. 14, 1995

[51] Int. Cl.$^6$ ................................................. G02B 6/26
[52] U.S. Cl. ............................ 385/15; 385/27; 385/50
[58] Field of Search .............................. 385/14, 15, 24, 385/27, 28, 39, 50; 372/43–45, 49

[56] References Cited

U.S. PATENT DOCUMENTS

| | | | |
|---|---|---|---|
| 3,666,351 | 5/1972 | Pao | 350/151 |
| 4,196,396 | 4/1980 | Smith | 330/4.3 |
| 4,229,710 | 10/1980 | Shoshan | 331/94.5 C |
| 4,239,329 | 12/1980 | Matsumoto | 350/96.15 |
| 4,745,607 | 5/1988 | Koch | 372/45 |
| 5,212,584 | 5/1993 | Chung | 359/260 |
| 5,272,711 | 12/1993 | Mawst et al. | 372/45 |
| 5,276,748 | 1/1994 | Magel | 385/37 |
| 5,287,214 | 2/1994 | Robertson et al. | 359/260 |
| 5,317,655 | 5/1994 | Pan | 385/11 |
| 5,343,542 | 8/1994 | Kash et al. | 385/31 |
| 5,367,582 | 11/1994 | Magel | 385/1 |
| 5,386,426 | 1/1995 | Stephens | 372/20 |
| 5,402,509 | 3/1995 | Fukushima | 385/33 |
| 5,528,616 | 6/1996 | Kash et al. | 372/45 |

OTHER PUBLICATIONS

Jorg Gehler et al., *Arrow–based Optical Wavelength Filter In Silica*, 31 Electronics Letters, Vo.. 31, No. 7, 547–48, (Mar. 30, 1995).

Mao and Huang—An Arrow Optical Wavelength Filter: Design and Analysis—Jul. 1993—Journal of Lightwave Technology, vol. 11, No. 7, pp. 1183–1188.

Vincent Delisle et al.—Antiresonant Waveguide Add/drop Filter Using Fabry–Perot Interference—Jan. 1, 1995—Optics Communications 113(1995) 389–394.

Toshihiko Baba et al—Monolithic Integration of an Arrow–Type Demultiplexer and Photodetector in the Shorter Wavelength Region—Jan. 1990—Journal of Lightwave Tech. vol. 8, No. 1, pp. 99–105.

Toshihiko Baba et al—High Efficiency Light Coupling From Antiresonant Reflecting Optical Waveguide to Integrated Photodetector Using An Antireflecting Layer—Jun. 1990—Applied Optics—vol. 29, No. 18, pp. 2781–2792.

*Primary Examiner*—John D. Lee
*Attorney, Agent, or Firm*—Darby & Darby

[57] ABSTRACT

The antiresonant waveguide apparatus is for periodically selecting a first series of at least one optical wavelength from a first incoming light signal. It comprises a first waveguide having an input for receiving the incoming light signal, the first waveguide having guiding mirrors for guiding the incoming light signal, one of the guiding mirrors being a first partial reflectivity mirror; a second waveguide having guiding mirrors for guiding an outputting light signal containing the first series of at least one wavelength; and a first Fabry-Perot resonator adjacent to the first partial reflectivity mirror, and forming one of the guiding mirrors of the second waveguide. The Fabry-Perot resonator is a second partial reflectivity mirror for the second waveguide. The Fabry-Perot resonator has a predetermined thickness determining the first series of at least one optical wavelength transmitted through the Fabry-Perot resonator from the first waveguide to the second waveguide.

10 Claims, 9 Drawing Sheets

ANTIRESONANT WAVEGUIDE APPARATUS FOR PERIODICALLY SELECTING A SERIES OF AT LEAST ONE OPTICAL WAVELENGTH FROM AN INCOMING LIGHT SIGNAL

FIELD OF THE INVENTION

The present invention is concerned with an antiresonant waveguide apparatus for periodically selecting a series of at least one optical wavelength from an incoming light signal. More specifically, the present invention can be used either as multiplexer/demultiplexer, an add/drop filter, or a narrow band filter of optical wavelengths.

BACKGROUND OF THE INVENTION

Known in the art, there is the U.S. Pat. No. 5,343,542 of Jeffrey A. Kash et al, granted on Aug. 30, 1994 in which there is described a tapered. Fabry-Pérot waveguide optical demultiplexer apparatus. The apparatus provides a waveguide optical demultiplexer or spectrometer for applications in optical communications. The apparatus can select at least one optical wavelength from a plurality of optical wavelengths. The two major elements of this apparatus are a waveguide having a partial mirror along its length to reflect optical wavelengths therein, and an optical resonator where one of its resonating mirrors is the partial mirror of the waveguide. Selected wavelengths are then extracted from the waveguide and resonated in the resonator.

One drawback of the apparatus described in Kash is that, after the extraction of the selected wavelengths from the waveguide, the only way to collect the selected wavelengths from the resonator for further use is to place a photodetecting array along the resonator. These selected wavelengths can then be converted into electrical signals via the photodetecting array.

Also known in the art, there is the article by W. P. Huang et al, published by the Journal of Lightwave Technology, Vol. 11, No. 7, July 1993, in which there is described an ARROW-based optical wavelength filter. This filter comprises two asymmetrical waveguides wherein only one wavelength is selected.

One problem with the apparatus described in Huang is that it cannot select several wavelengths simultaneously. It is also very difficult to couple asymmetric waveguides over to optical fibres. Furthermore, this apparatus requires three different materials, which is incompatible with standard optical integration.

Also known in the art, there are the U.S. Pat. Nos. 3,666,351; 4,196,396; 4,229,710; 4,239,329; 4,745,607; 5,212,584; 5,272,711; 5,276,748; 5,287,214; 5,317,655; 5,367,582; 5,386,426; 5,402,509 which describe different apparatuses relating to optical devices.

None of the above patents provide the necessary means for easily coupling in a simple manner at least one selected optical wavelength from a first waveguide over to a second waveguide so that such selected optical wavelengths can then be easily redirected into an optical fibre.

An object of the present invention is to provide an apparatus for directly coupling at least one selected optical wavelength from a first waveguide over to a second waveguide so that such selected optical wavelengths can then be easily redirected into an optical fibre.

SUMMARY OF THE INVENTION

According to the present invention, there is provided an antiresonant waveguide apparatus for periodically selecting a first series of at least one optical wavelength from a first incoming light signal, comprising:

a first waveguide having an input for receiving the incoming light signal, the first waveguide having guiding mirrors for guiding the incoming light signal, one of the guiding mirrors being a first partial reflectivity mirror;

a second waveguide having guiding mirrors for guiding an outputting light signal containing the first series of at least one wavelength; and a first Fabry-Perot resonator adjacent to the first partial reflectivity mirror, and forming one of the guiding mirrors of the second waveguide, the Fabry-Perot resonator being a second partial reflectivity mirror for the second waveguide, the Fabry-Perot resonator having a predetermined thickness determining the first series of at least one optical wavelength transmitted through the Fabry-Perot resonator from the first waveguide to the second waveguide.

According to the present invention, there is also provided a method for periodically selecting a first series of at least one optical wavelength from a first incoming light signal, comprising steps of:

receiving the incoming light signal by means of an input of a first waveguide, the first waveguide having guiding mirrors for guiding the incoming light signal, one of the guiding mirrors being a first partial reflectivity mirror;

guiding an outputting light signal containing the first series of at least one wavelength by means of a second waveguide having guiding mirrors; and providing a first Fabry-Perot resonator adjacent to the first partial reflectivity mirror, and forming one of the guiding mirrors of the second waveguide, the Fabry-Perot resonator being a second partial reflectivity mirror for the second waveguide, the Fabry-Perot resonator having a predetermined thickness determining the first series of at least one optical wavelength transmitted through the Fabry-Perot resonator from the first waveguide to the second waveguide.

The objects, advantages and other features of the present invention will become more apparent upon reading of the following non restrictive description of a preferred embodiment thereof given for the purpose of exemplification only with reference to the accompanying drawings.

DETAILED DESCRIPTION OF THE DRAWINGS

Figure 1:
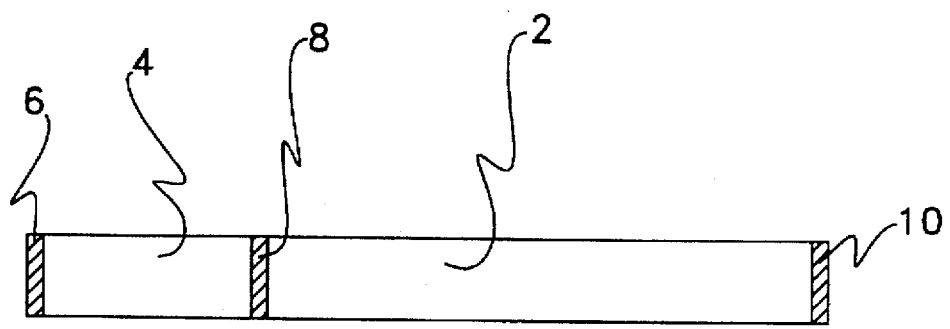
FIG. 1 is a schematic front view of the tapered Fabry-Pérot waveguide optical demultiplexer apparatus known in prior art.
Figure 2:
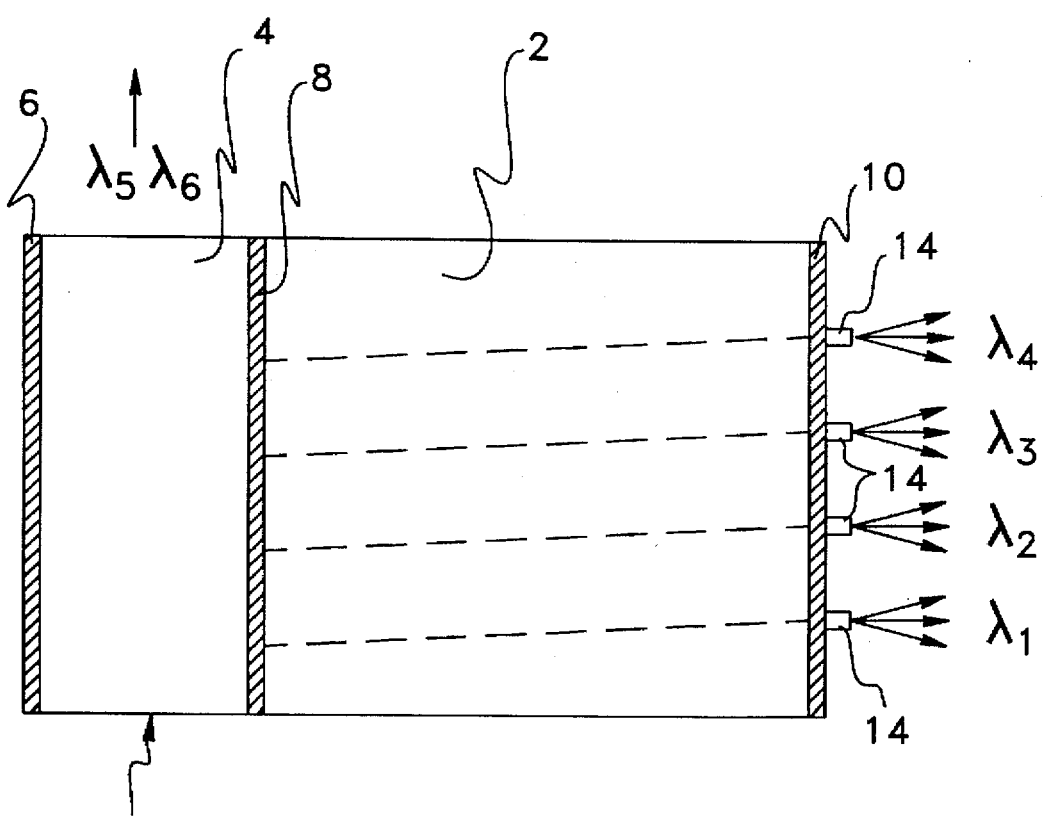
FIG. 2 is a schematic top view of the tapered Fabry-Pérot waveguide optical demultiplexer apparatus known in prior art.

Similar elements throughout the drawings are identified by the same reference numbers. Referring now to FIGS. 1 and 2, there is shown in a schematic manner a device of the prior art, similar to the one shown in the U.S. Pat. No. 5,343,542. This device comprises a Fabry-Pérot 2 resonator having a resonating cavity which is perpendicular to the light propagation direction of the light guided through the core of the waveguide 4. The device also comprises first, second and third high reflectivity mirrors 6, 8 and 10. The first, second and third reflectivity mirrors 6, 8 and 10 are fabricated as distributed mirrors or DBR mirrors. In this device, there is only one waveguide 4 and a Fabry-Pérot resonator 2. It has to be noted that the Fabry-Pérot resonator 2 is provided with two high reflectivity mirrors 8 and 10.

In this device, the wavelengths $\lambda_1$, $\lambda_2$, $\lambda_3$ and $\lambda_4$ are selected and trapped in the cavity of the resonator 2. To recuperate the wavelengths $\lambda_1$, $\lambda_2$, $\lambda_3$ and $\lambda_4$, a photodetecting array of detectors 14 is mounted on the side of the Fabry-Pérot resonator 2 for converting the wavelength signals into electrical signals. It can be seen that the wavelengths $\lambda_1$, $\lambda_2$, $\lambda_3$ and $\lambda_4$ cannot be easily rerouted into an optical fibre. With this device, it is not possible to do an add/drop filter for an optical communication system.

Figure 3:
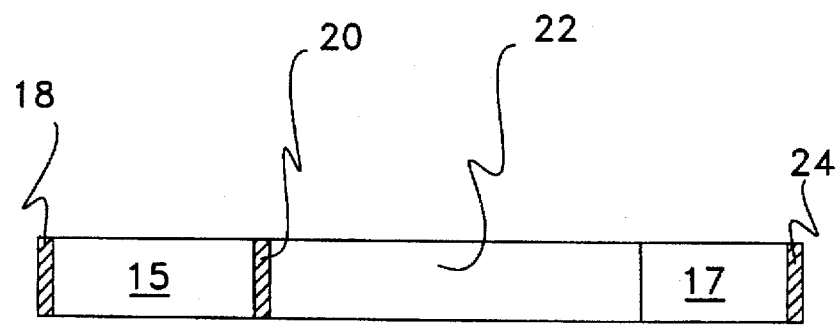
FIG. 3 is a schematic front view of an apparatus according to the present invention.
Figure 4:
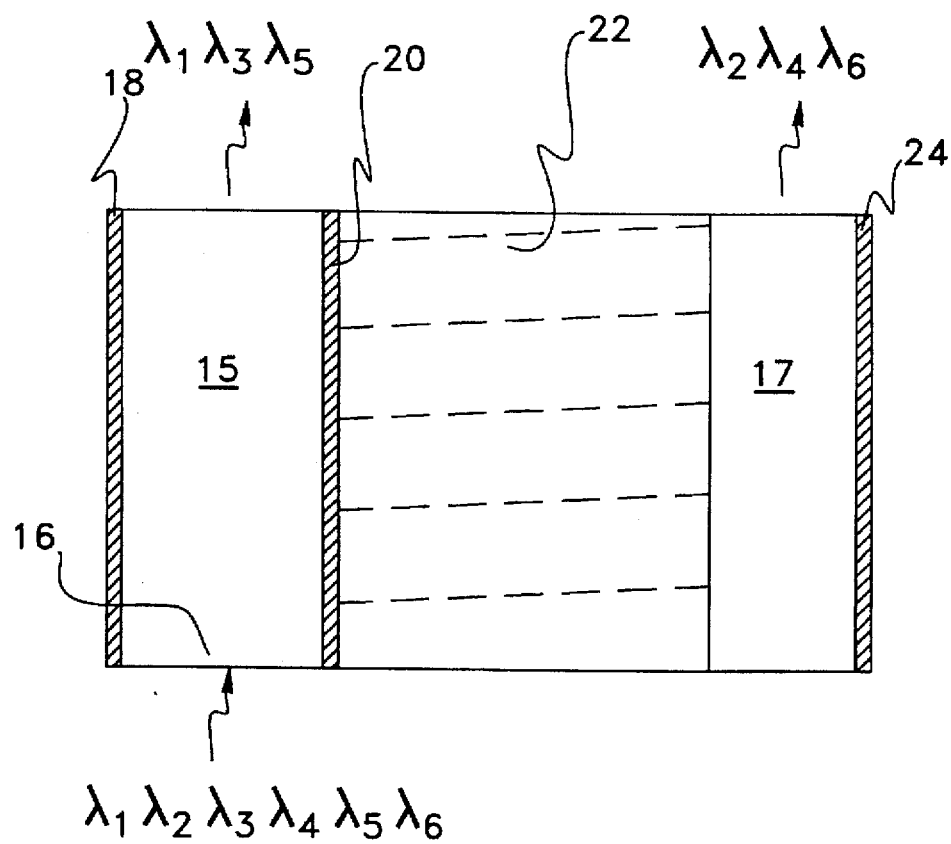
FIG. 4 is a schematic top view of the apparatus shown in FIG. 3.

Referring now to FIGS. 3 and 4, there is shown, in a schematic manner, an antiresonant waveguide apparatus according to the present invention. The apparatus is for periodically selecting a first series of at least one optical wavelength from a first incoming light signal. In this preferred embodiment, the incoming light signal has wavelength $\lambda_1$ to $\lambda_6$. The at least one wavelength includes wavelengths $\lambda_2$, $\lambda_4$ and $\lambda_6$.

The apparatus comprises a first waveguide 15 having an input 16 for receiving the incoming light signal. The first waveguide 15 has guiding mirrors 18 and 20 for guiding the incoming light signal. One of the guiding mirrors 18 and 20 is a first partial reflectivity mirror 20.

A second waveguide 17 is provided. It has guiding mirrors 22 and 24 for guiding an outputting light signal containing the first series of wavelengths $\lambda_2$, $\lambda_4$, and $\lambda_6$. The guiding mirror 22 is a Fabry-Perot resonator 22 which is adjacent to the first partial reflectivity mirror 20. The Fabry-Perot resonator 22 is a partial reflectivity mirror 22 for the second waveguide 17. The Fabry-Perot resonator 22 has a predetermined thickness determining the first series of optical wavelengths $\lambda_2$, $\lambda_4$, and $\lambda_6$ transmitted through the Fabry-Perot resonator 22 from the first waveguide 15 to the second waveguide 17.

The device of the prior art shown in FIGS. 1 and 2 will be compared to the apparatus shown in FIGS. 3 and 4. In the prior art device, there is only one waveguide 4, the Fabry-Pérot resonator 2 is only used as a resonator and on both sides of the Fabry-Pérot resonator 2 there are high reflectivity mirrors 8 and 10 whereas, in the apparatus shown in FIGS. 3 and 4, there are two waveguides 15 and 17 that are coupled, the Fabry-Pérot resonator 22 is used as a reflectivity mirror for the second waveguide 17 and the Fabry-Pérot resonator is adjacent to the low reflectivity mirror 20.

In the apparatus according to the present invention and shown in FIGS. 3 and 4, the Fabry-Pérot resonator 22 is used to reflect the selected wavelengths into the second waveguide 17 so that they can be easily rerouted into an optical fibre (not shown) from the second waveguide 17 whereas, in the prior art device, the selected wavelengths are trapped in the Fabry-Pérot resonator 2 and to extract the signals carried by these wavelengths photoelectric converters 14 are needed. Also, the prior art device cannot be used to make an add/drop filter, a multi/demultiplexer or an optical filter whereas it is possible with the apparatus according to the present invention.

Figure 5:
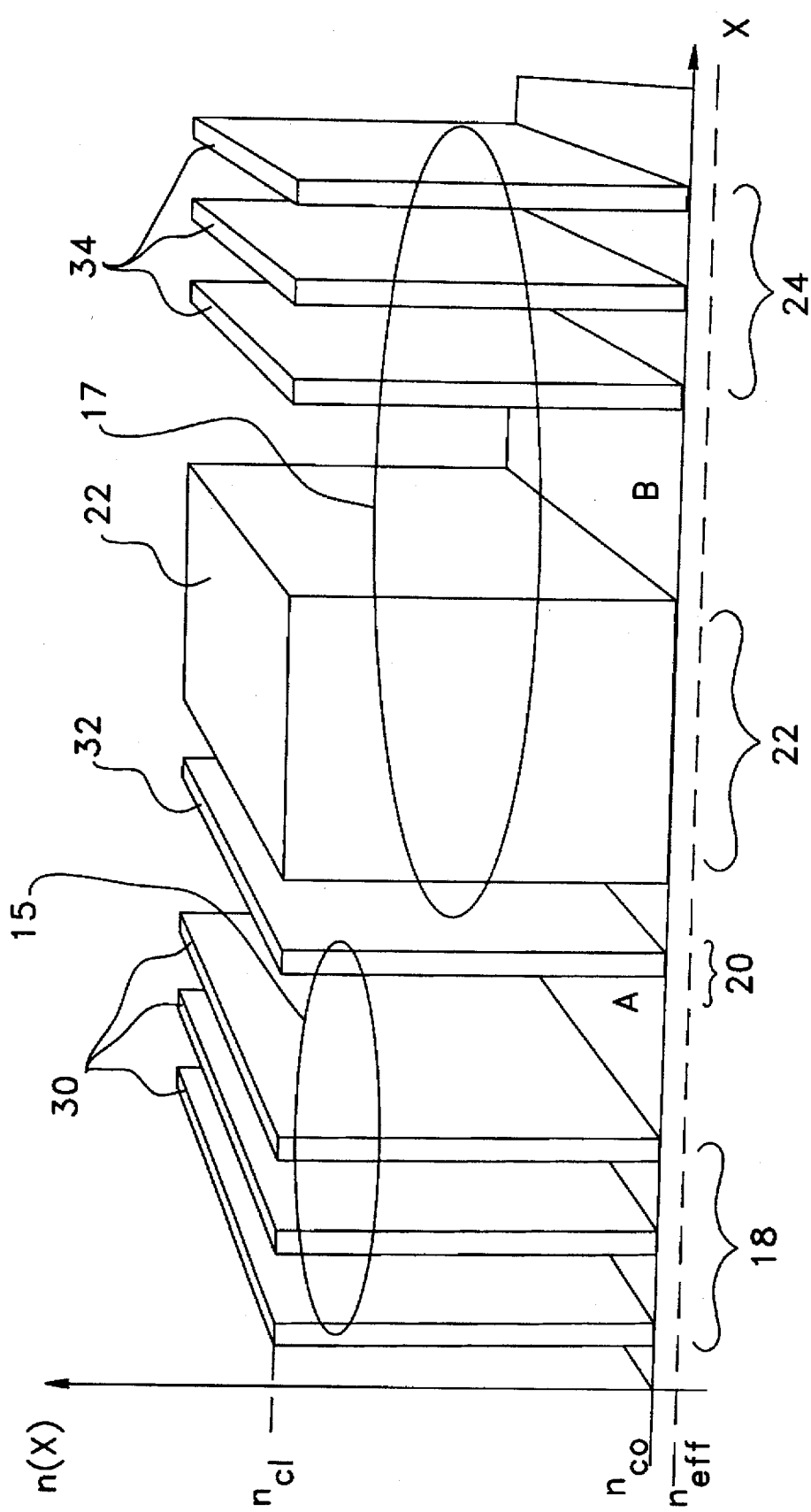
FIG. 5 is a diagram of the refractive indexes and thicknesses of elements of the apparatus shown in FIGS. 3 and 4 with respect to position x.

Referring now to FIG. 5, there is shown in a schematic manner, how the apparatus illustrated in FIGS. 3 and 4 is made. FIG. 5 shows the refractive indexes and the thicknesses of the elements of the apparatus shown in FIGS. 3 and 4 with respect to position x. The first waveguide 15 has a core A and two mirrors 18 and 20. The two mirrors 18 and 20 are a high reflectivity mirror 18 and the partial reflectivity mirror 20. The first high reflectivity mirror 18 includes three cladding layers 30. The first partial reflectivity mirror 20 includes one cladding layer 32.

The second waveguide 17 has a core B and two mirrors 22 and 24. The two mirrors are a high reflectivity mirror 24 and the partial reflectivity mirror 22 which is the Fabry-Perot resonator 22. The high reflectivity mirror 24 includes three cladding layers 34. The cores A and B of the waveguides 15 and 17 have a similar thickness $D_{co}$ and a similar refractive index $n_{co}$ which is different from the one $n_{c1}$ of the cladding layers 30, 32 and 34, and of the Fabry-Pérot resonator 22. The distance between two of the cladding layers 30 or 34 that are adjacent is $D_{co}/2$. The distance between the Fabry-Perot resonator 22 and the adjacent cladding layer 32 is $D_{co}/2$.

The cladding layers 30, 32 and 34 of the high reflectivity mirrors 18 and 24 and of the first partial reflectivity mirror 20 each has a similar thickness $D_{c11}$ determined by the following first equation:

$$D_{c11} = \frac{(2N_1 - 1)\lambda_c}{4\sqrt{n_{c1}^2 - n_{co}^2 + (\lambda_c/2D_{co})^2}}$$

where $\lambda_c$ is a communication bandwidth central wavelength determined by operating condition chosen by a user, and $N_1$ is an antiresonance condition order determined by the operating condition. The Fabry-Perot resonator 22 has a thickness $D_{c12}$ determined by the following second equation:

$$D_{c12} = \frac{(2N_2 - 1)\lambda_d}{4\sqrt{n_{c1}^2 - n_{co}^2 + (\lambda_d/2D_{co})^2}}$$

where $N_2$ is calculated by means of the following third equation:

$$N_2 = \frac{\lambda_d}{\Delta\lambda}$$

where $\lambda_d$ is a wavelength chosen by the user and to be transmitted through the Fabry-Perot resonator 22, and $\Delta\lambda$ is the free spectral range of the device and it is determined by the operating condition. For example, if $D_{co}$ is 8 μm, $n_{co}$ is 1.52, $n_{c1}$ is 1.57, $\Delta\lambda$ is 11.94 nm, $N_1$ is 1, $\lambda_d$ is 633 nm and $\lambda_c$ is 633 nm then $D_{c11}$ is 0.436 μm and $D_{c12}$ is 42.1 μm.

The principle of operation will be explained by referring to the embodiment for the add/drop filter depicted in FIG. 5.

The embodiment can be considered as two coupled antiresonant reflecting optical waveguides or ARROW's, which are marked by the circles. The embodiment incorporates a Fabry-Pérot resonator having a relatively thick layer where Fabry-Pérot interference is such that only light at certain selected wavelengths couples efficiently from core A to core B. Light at other wavelengths goes on through to the output of core A.

As is well known from directional coupler theory, light from core A can couple efficiently to core B only when the two are phase-matched or almost phase-matched, i.e. when the real parts of the propagation constants are nearly equal for the two waveguides taken separately. By designing the cores to have substantially the same thickness $D_{c0}=8$ µm, a good connection from the ARROW waveguide core to a single mode fiber is guaranteed.

The wavelength selectivity of the apparatus is realized through the choice of different cladding layer thicknesses for the two ARROW's, this difference in thickness being due to the thickness of the Fabry-Pérot resonator. In order to obtain the best possible fabrication tolerances for the apparatus, the thicknesses of the cladding layers of the waveguides have to be adjusted to the antiresonant condition. For the adjustment of the cladding layer thickness $D_{c11}$ to the antiresonant condition the approximation is given by the first equation.

The embodiment of an add/drop filter shown in FIG. 5 is based on a polymer material system where the core and cladding refractive indexes are 1.52 and 1.57 respectively. The effect of material dispersion and losses were neglected in the present explanations. With the given material parameters one obtains the following cladding layer thicknesses $D_{c11}=0.4$ µm and $D_{c12}=42.06$ µm.

The reader should keep in mind that the first and second equations are approximations and obtained thicknesses for the cladding layers are only estimates. Therefore the whole design for the structure was checked by calculating the dispersion relation, i.e. the effective index or the real part of the propagation constant as a function of the wavelength for ARROW's separately. From a well known transfer matrix method, four equations for the determination of the propagation constant can be obtained.

$$k_0 p_a M_{11} + k_0^2 p_a p_b M_{12} + M_{21} + k_0 p_b M_{22} = 0,$$
$$p_{a/b} = K_{a/b} \text{ for } TE\text{-polarization}$$

$$p_{a/b} = \frac{K_{a/b}}{(n_{a/b})^2} \text{ for } TM\text{-polarization};$$

$$K_{a/b} = \sqrt{n_{a/b}^2 - \beta^2} \quad ; k_0 = 2\pi/\lambda$$

where $M_{ij}$ denote the matrix elements of the complete transfer matric for each single ARROW. It turns out that the estimates for the cladding layer thicknesses were quite good. Only a correction for the thickness $D_{c11}$ from 0.4 to 0.436 µm was necessary to achieve phase-matching between the ARROW's.

With this correction the dispersion relation of the fundamental ARROW mode was calculated from the four equations. Over narrow bands centered on 621, 633, 645 nm, etc . . . , efficient coupling takes place so that power will outcouple from core B after a certain coupling length. At other wavelengths there is no phase-matching between ARROW's and the injected light remains in core A.

Although we discuss only the case of TE-polarized light the whole design process, or the determination of the cladding layer thicknesses, so far is identical for the TE-polarized and the TM-polarized light. But this is no longer valid for the determination of an apparatus operation length or half beat length of an ARROW-based add/drop filter. For this purpose we have to calculate the effective index of the symmetric $n_{eff}^s(\lambda)$ and antisymmetric supermode $n_{eff}^a(\lambda)$ for the complete structure. The supermodes are obtained also by means of the four equations. The transfer matrix elements $M_{ij}$ are now built up for the complete structure. The difference in the effective indexes between the symmetric and antisymmetric supermode gives the operation length $L(\lambda)$ of the device as a function of the wavelength according to the formula:

$$L(\lambda) = \frac{\lambda_d}{2(n_{eff}^s - n_{eff}^a)}$$

A central wavelength $\lambda_c$ having a value of 633 nm was used to determine the operation length. According to the polarization of the incoming light or TE/TM, we got half beat lengths of 50 mm/45 mm for the ARROW add/drop filter.

This relatively long coupling length could not be reduced in the present configuration without diminishing the spectral finesse. The coupling length and the finesse are somehow intimately related. One way to reduce this length without affecting the finesse would be to reduce the core size. But this would cause a mismatch in coupling to optical fibers.

Computations show a good tolerance to small changes in the antiresonant layer thicknesses. This is a feature of an ARROW waveguide. Variations of as much as 10% in the antiresonant layer thickness along the coupler will not affect very much our selectivity except for a small loss in the finesse. This is not the case for the thick layer which acts as a Fabry-Pérot resonator. Variations in its thickness will result in a change of the selected wavelength. To keep a good selectivity, the thickness of the Fabry-Pérot resonator must remain under 0.1% of variation or lower than 0.4 µm. This is something really hard to achieve in slab waveguides, but not impossible. A good lithographic setup could provide this kind of precision.

Figure 6A:
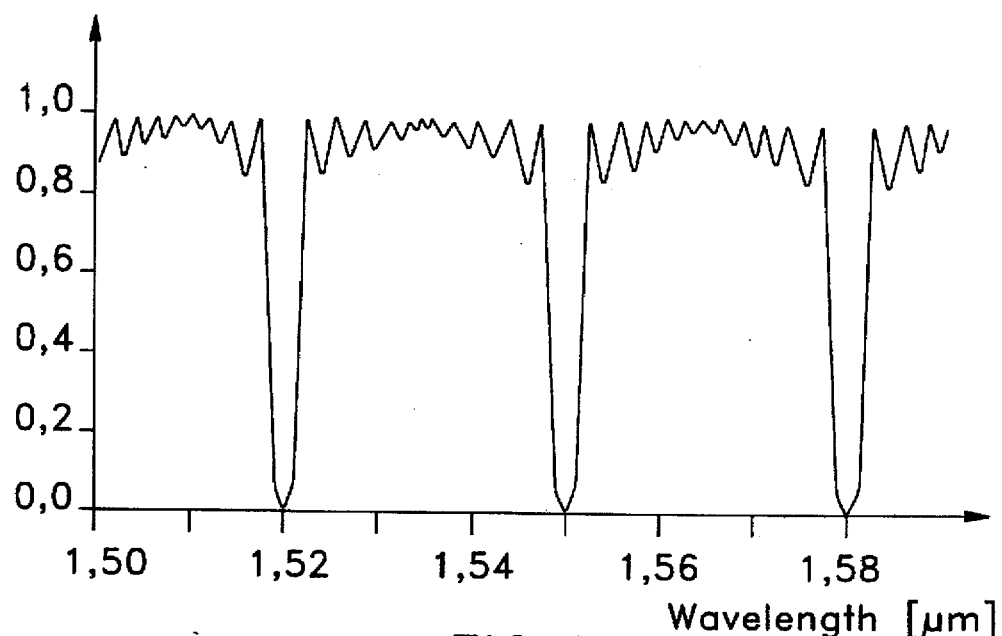
FIGS. 6, (a) and (b), are diagrams showing output signal intensities with respect to wavelength.

Referring now to FIG. 6, there is shown results of supermode calculations for the embodiment shown in FIG. 5, where the output intensity of core A and B are plotted as a function of input light wavelength. One recognizes here the familiar Fabry-Pérot periodic filtering function. The peaks have a linewidth of 1.2 nm. The free spectral range was designed to be 12 nm by choosing $D_{c12}$ to be 42.06 µm. The finesse of the Fabry-Pérot filtering is therefore 10. This finesse would enable one to select one channel out of a uniform comb of as many as five.

Note that potential uses of this filter are not restricted to uniform combs of input wavelengths. By cascading embodiments as the one shown in FIG. 5 with different free spectral ranges one could take advantage of a vernier effect and obtain much more widely separated transmission peaks.

Figure 6B:
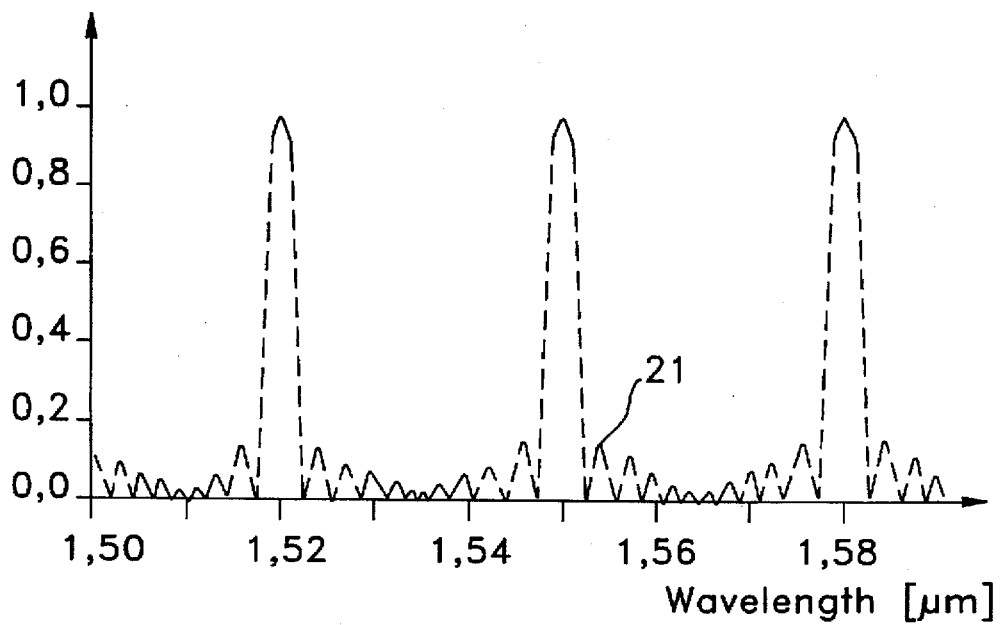

The side lobe 21 suppression ratio in FIG. 6b falls in the range 8 to 16 dBs. Higher suppression ratios could be obtained in systems applications by cascading two or more filters as the one shown in FIG. 5.

Figure 7:
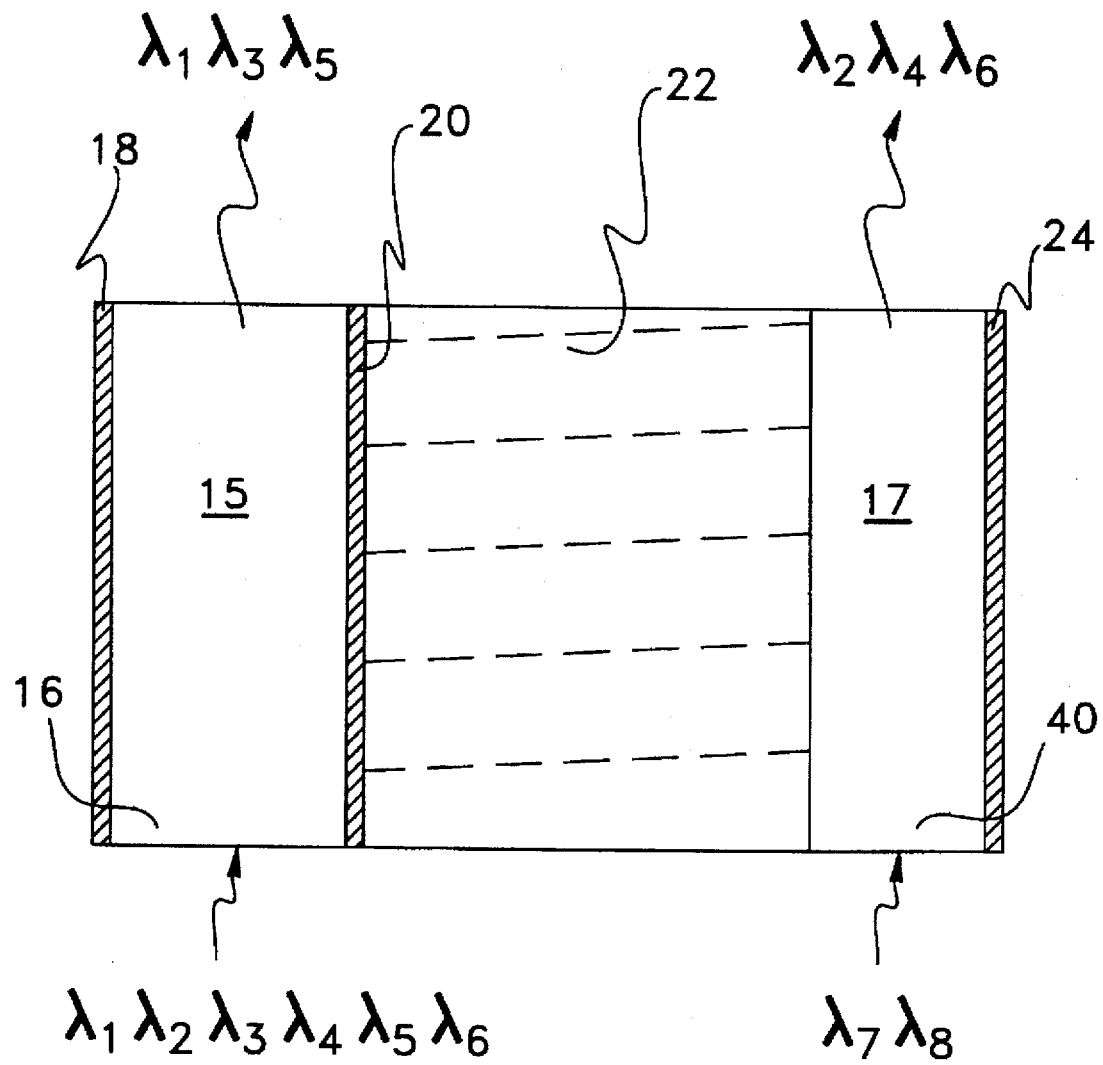
FIG. 7 is a schematic top view of an apparatus according to the present invention.

Referring now to FIG. 7, there is shown an apparatus similar to the one shown in FIG. 4 except that the second waveguide 17 comprises an input 40 for receiving a second incoming light signal including wavelengths $\lambda_7$ and $\lambda_8$. If $\lambda_7$ and $\lambda_8$ are optical wavelengths of the first series of at least one optical wavelengths, they will be coupled out of core 17 to core 15 and so added to $\lambda_1$, $\lambda_3$, $\lambda_5$.

Figure 8:
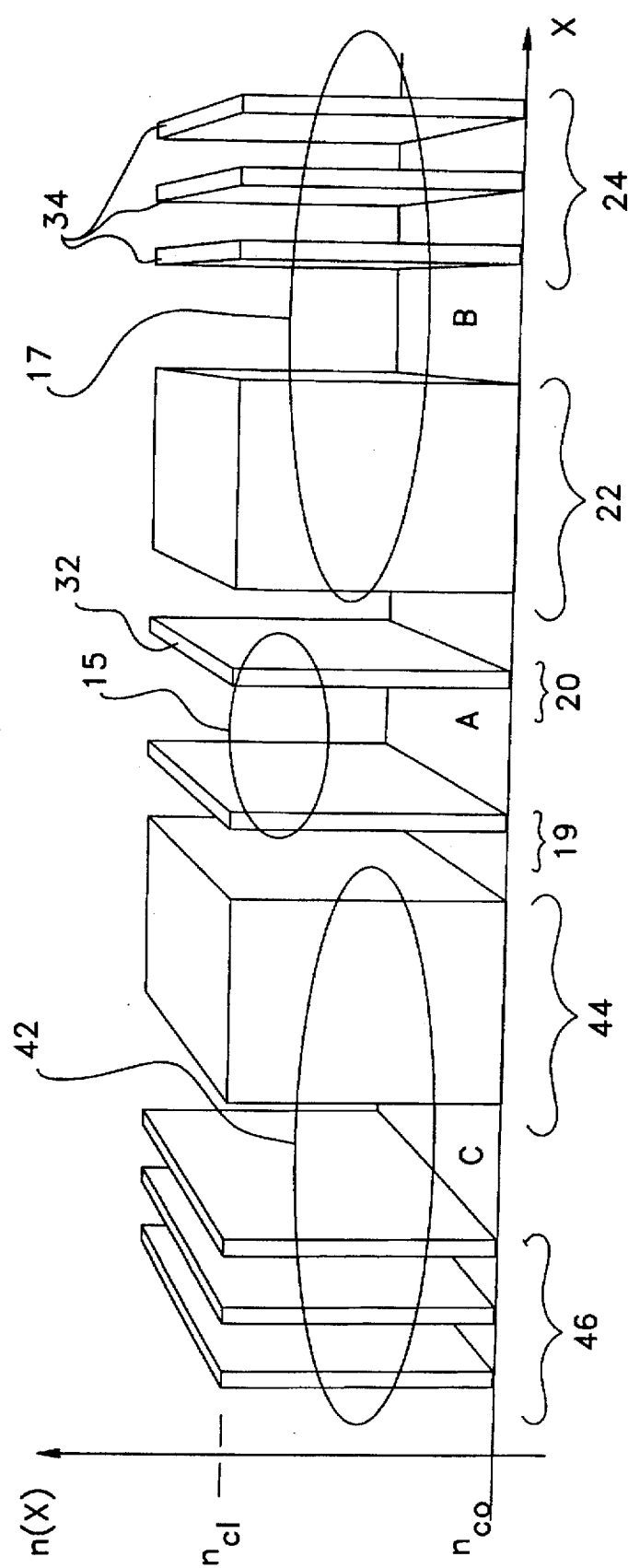
FIG. 8 is a diagram of the refractive indexes and thicknesses of elements of an apparatus according to the present invention with respect to position x.

Referring now to FIG. 8, there is shown, in a schematic manner, how another apparatus according to the present invention is made. FIG. 8 shows the refractive indexes and thicknesses of the elements of the apparatus with respect to position x. The first waveguide 15 has a second guiding mirror 19 that is a partial reflectivity mirror 19. The apparatus further comprises a waveguide 42 having guiding mirrors 44 and 46 for guiding a second outputting light signal containing a second series of at least one wavelength.

A second Fabry-Perot resonator 44 is provided. It is adjacent to the partial reflectivity mirror 19, and forms one 44 of the guiding mirrors 44 and 46 of the waveguide 42. The second Fabry-Perot resonator 44 is a partial reflectivity mirror 44 for the waveguide 42. The second Fabry-Perot resonator 44 has a predetermined thickness determining the second series of at least one optical wavelength transmitted through the second Fabry-Perot resonator 44 from the core A of the waveguide 15 to the core C of the waveguide 42.

The embodiment shown in FIG. 5 fulfills the functionality of the conventional lumped element Fabry-Pérot. We can take advantage of the integrated optics to go beyond the capability of the embodiment shown in FIG. 5 and design a second embodiment of the ARROW add/drop filter such as the one shown in FIG. 8 which drops two series of wavelengths at once. In effect this dual filter can replace two embodiments such as the one shown in FIG. 5.

The embodiment of a dual ARROW add/drop filter is shown in FIG. 8. Basically, we have added a third ARROW to the embodiment of FIG. 5. As a first approximation, the operation of the apparatus of the FIG. 8 can be understood as being simply the simultaneous operation of two ARROW filters or two embodiment of the type shown in FIG. 5. The cladding layer thickness $D_{c13}$ of third ARROW 42 is chosen so that the wavelengths dropped into core C are 6 nm away from the wavelengths dropped into core B. Using the order N=53 and the dropping wavelength $\lambda_d$=627 nm we obtain as a good approximation for $D_{c13}$=41.66. As before this thickness had to be corrected to $D_{c13}$=41.71 to achieve phase-matching between the ARROW with core A and the ARROW with core C at those wavelengths by means of the four equations.

From the field profiles of the symmetric and antisymmetric supermodes, it can be recognized that phase matched coupling between ARROW with core A and ARROW with core B or C occurs independently for the dropped wavelengths $\lambda_d^B/\lambda_d^C$. This can be summarized in the following relations:

$$n_{eff}^C(\lambda_d^B) \neq n_{eff}^A(\lambda_d^B) = n_{eff}^B(\lambda_d^B)$$

$$n_{eff}^C(\lambda_d^C) = n_{eff}^A(\lambda_d^C) \neq n_{eff}^B(\lambda_d^C).$$

Figure 9A:
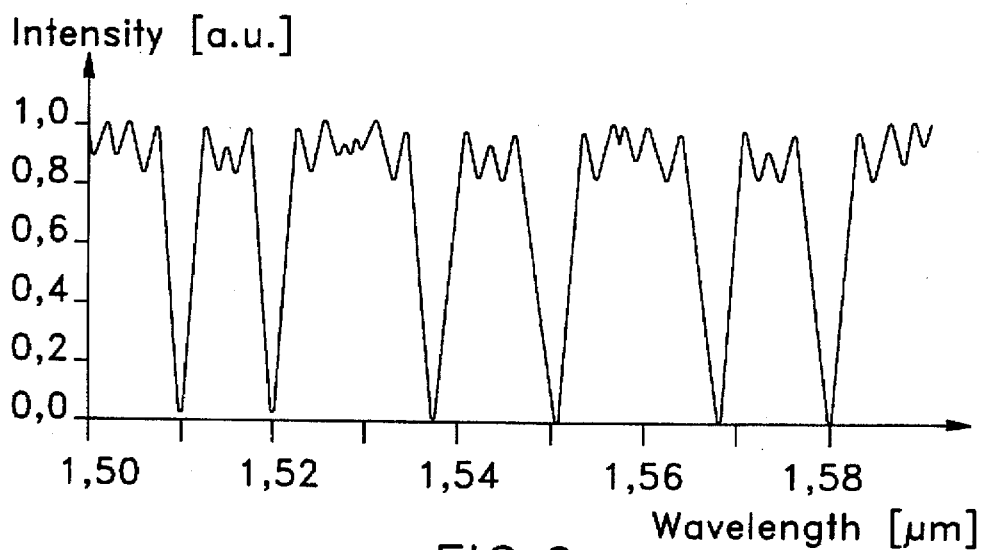
FIGS. 9, (a), (b) and (c), are diagrams showing output signal intensities with respect to wavelength.
Figure 9B:
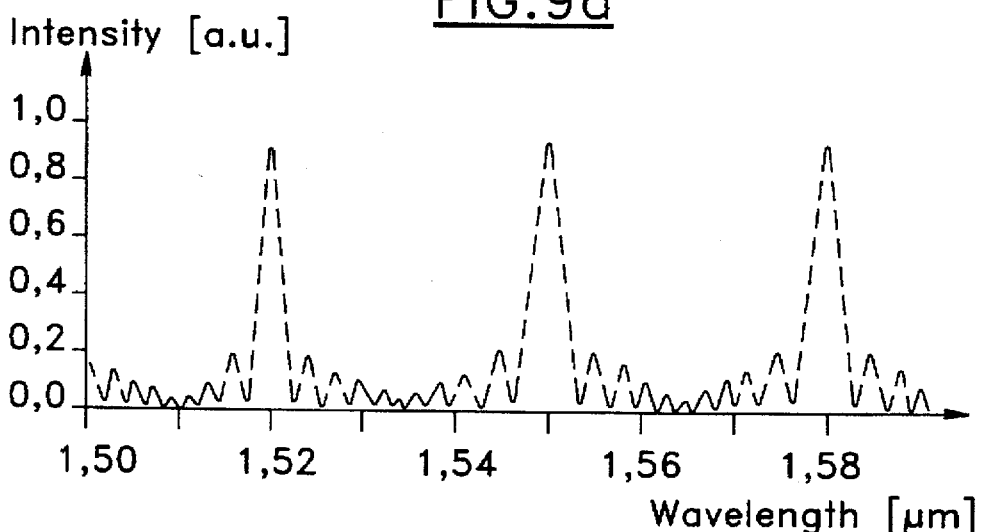
Figure 9C:
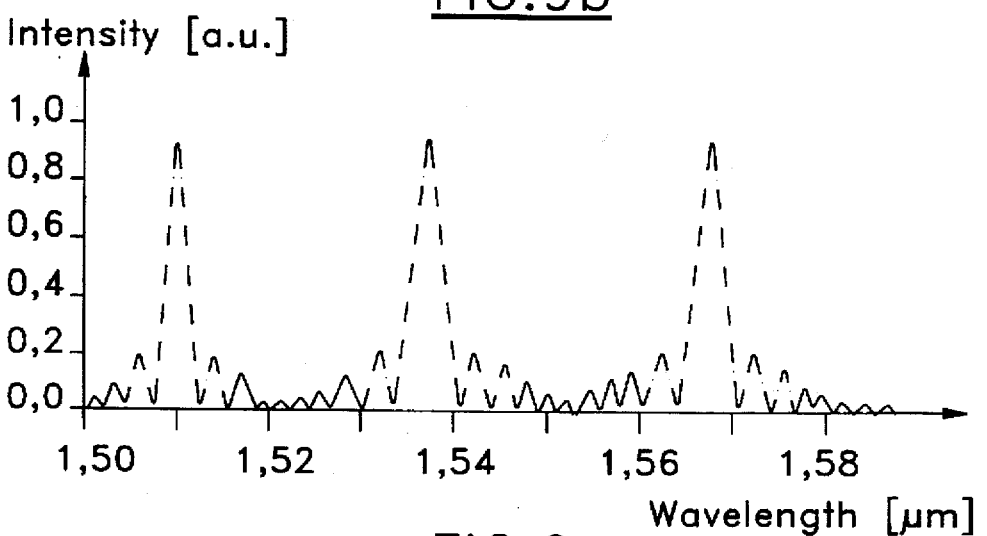

Referring now to FIG. 9, there are shown the output intensities as a function of the wavelength for the embodiment of a dual ARROW add/drop filter shown in FIG. 8. The results are the expected ones. The output signal characteristic of core B is identical to the one obtained with the embodiment shown in FIG. 5. This underlines the fact that in the embodiment of an ARROW add/drop coupler as shown in FIG. 8, there is no interaction between core A and core C. The output of core C is practically identical to the output of core B, there is only a shift of about 6 nm.

Figure 10:
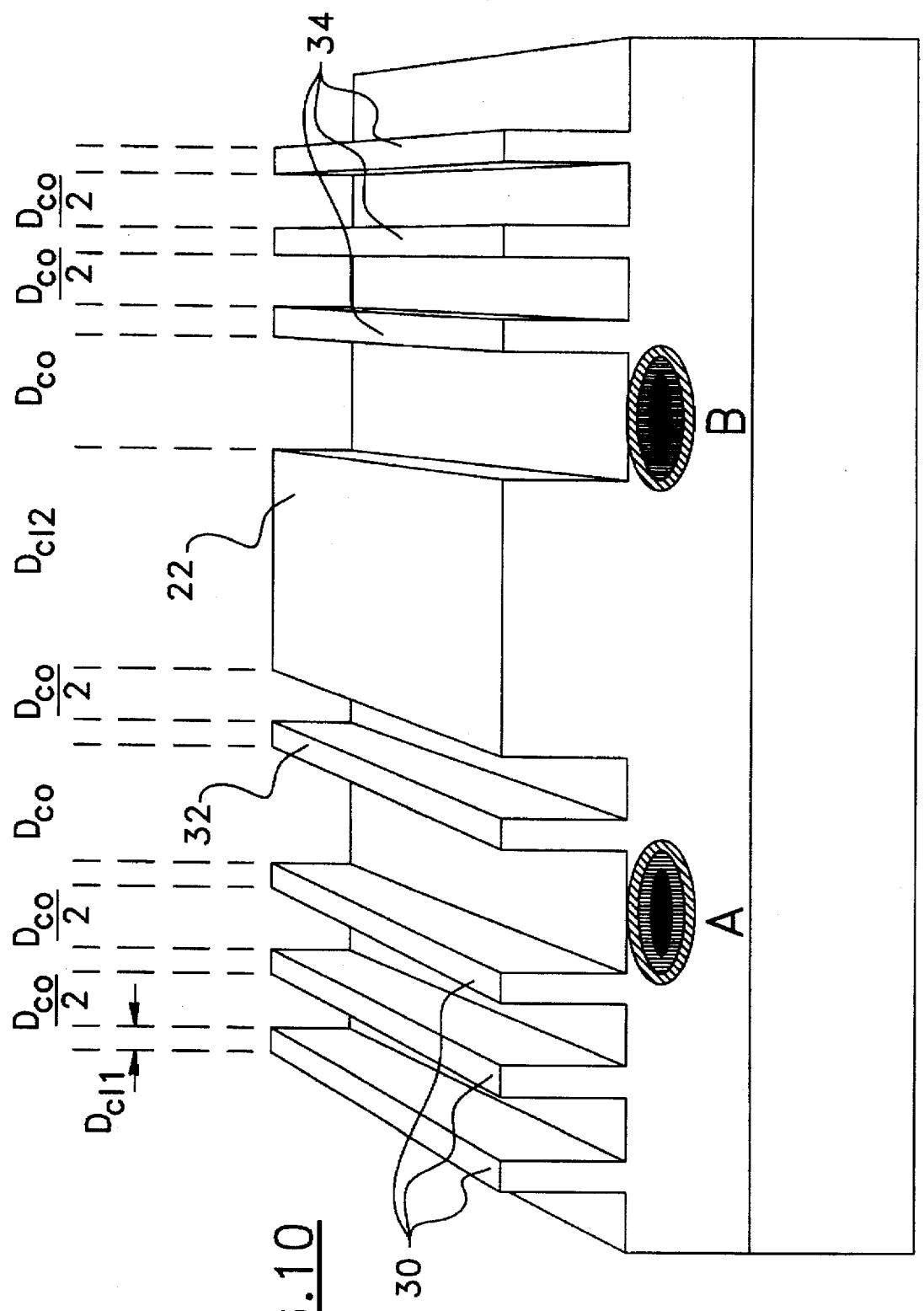
FIG. 10 is a perspective view of an apparatus according to the present invention.

Referring now to FIG. 10, there is shown, in a schematic manner, how an apparatus shown in FIG. 5 is made. FIG. 10 shows an optical wavelength filter based on asymmetric ARROW coupler in strip configuration. The ARROW filter of the type shown in FIG. 5 has been fabricated on an oxydized Si wafer. SiON of n=1.65 and 0.5 μm thickness was deposited on this wafer by PECVD. After electron-beam direct writing the structure was transferred to SiON by reactive ion etching or RIE. Typical strip widths are in the submicrometer range, between 0.4 and 0.6 μm. Finally the whole structure was covered over with $SiO_2$.

Figure 11A:
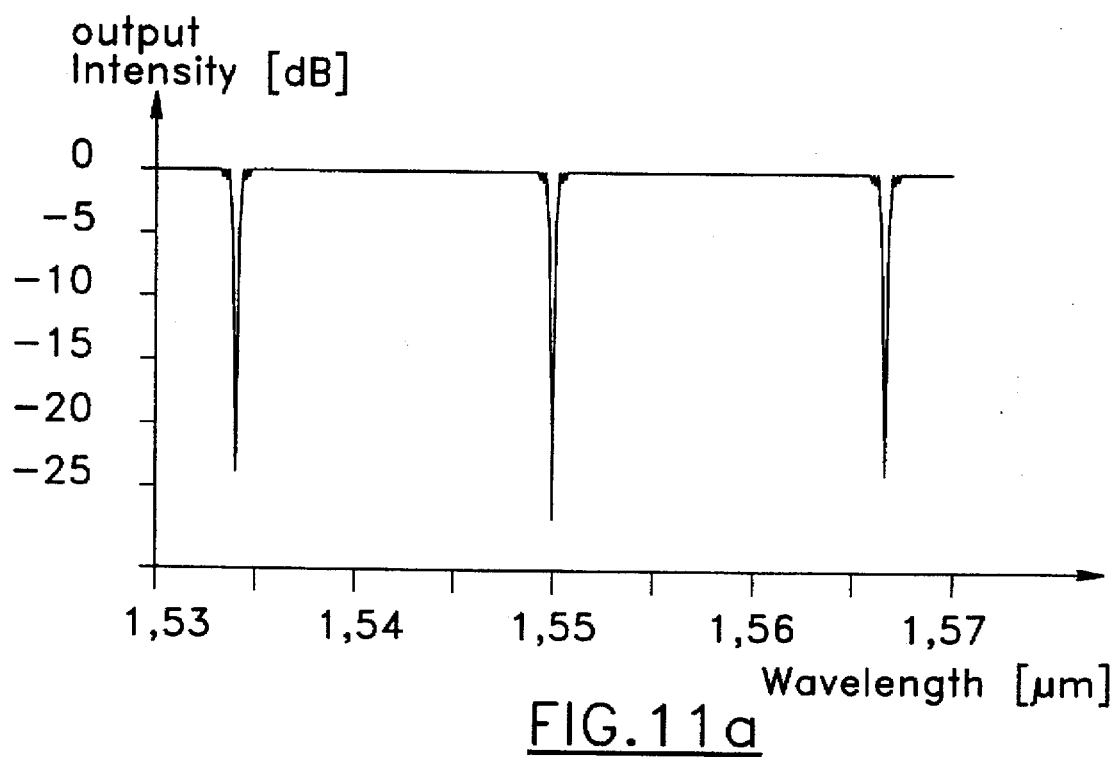
FIGS. 11a and 11b, in some instances referred to collectively as FIG. 11, are diagrams showing output signal intensities with respect to wavelength.
Figure 11B:
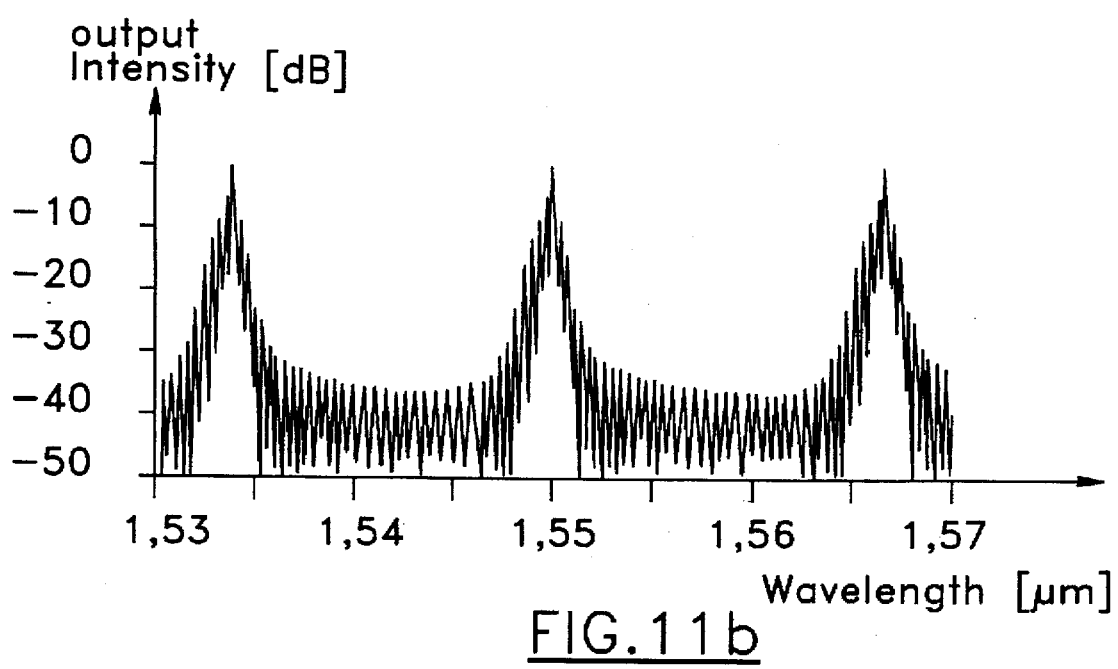

Referring now to FIG. 11, there are shown the output intensities as a function of the wavelength for an embodiment of an ARROW filter that is similar to the one shown in FIG. 10 except that the cores A and B have not exactly the same thickness. Cores A and B can be viewed as being slightly asymmetric. For example, cores A and B can have respectively thicknesses of 15.0 μm and 16.5 μm. From the output signals, it can be appreciated that the finesse is increased.

The apparatus according to the present invention accomplishes a Fabry-Pérot filtering functionality by using the wavelength selective coupling between optical waveguides. By using a Fabry-Pérot resonator having a given thickness, selectivity is achieved despite the fact that the coupled waveguides have substantially equal core thicknesses, in contrast with filters based on conventional waveguides. For the apparatus according to the present invention, a resolution of 1.2 nm is obtained with a free spectral range of 12 nm. A dual output filter is also described, it could drop or add two different wavelengths at once in a wavelength division multiplexing system or a WDM system.

The apparatus according to the present invention is a planar waveguide structure which utilizes Fabry-Pérot resonators to achieve a fairly high and periodic wavelength selectivity, and which constitutes a first step towards an integrated optic implementation of Fabry-Pérot functionality. In contrast to the conventional Fabry-Pérot, the multilayer waveguide structure according to the present invention utilizes grazing incidence rays instead of normal incidence rays and provides two outputs instead of one output.

With the present invention, it is possible to obtain a spectrally narrow selectivity such as 1 to 2 nm and a periodic selectivity such as 6 to 12 nm that can be achieved in antiresonant reflecting optical waveguide structures or ARROW structures by incorporating relatively thick Fabry-Pérot resonator or Fabry-Pérot interference cladding layers. Two device configurations are proposed to achieve periodic selectivity by relying on the wavelength selective coupling between two and three ARROW waveguides which incorporate a Fabry-Pérot resonator having thick Fabry-Pérot layers. Both structures can be used as add/drop filters. The embodiment shown in FIG. 5 drops one series of wavelengths while the embodiment shown in FIG. 8 drops two series of wavelengths at once into different output channels. The add function is accomplished by simply reversing the direction of light in the input and output channels.

Although the invention has been described above in detail in the framework of a preferred embodiment, it should be understood that the scope of the present invention is to be determined by the appended claims.

We claim:

1. An antiresonant waveguide apparatus for periodically selecting a first series of at least one optical wavelength from a first incoming light signal, comprising:

a first waveguide having an input for receiving the incoming light signal, the first waveguide having guiding mirrors for guiding the incoming light signal, one of the guiding mirrors being a first partial reflectivity mirror;

a second waveguide having guiding mirrors for guiding an outputting light signal containing the first series of at least one wavelength; and a first Fabry-Perot resonator adjacent to the first partial reflectivity mirror, and forming one of the guiding mirrors of the second waveguide, the Fabry-Perot resonator being a second partial reflectivity mirror for the second waveguide, the Fabry-Perot resonator having a predetermined thickness determining the first series of at least one optical wavelength transmitted through the Fabry-Perot resonator from the first waveguide to the second waveguide.

2. An apparatus according to claim 1, wherein the first waveguide having a second of its guiding mirrors that is a third partial reflectivity mirror, the apparatus further comprising:

a third waveguide having guiding mirrors for guiding an outputting light signal containing a second series of at least one wavelength; and a second Fabry-Perot resonator adjacent to the third partial reflectivity mirror, and forming one of the guiding mirrors of the third waveguide, the second Fabry-Perot resonator being a fourth partial reflectivity mirror for the third waveguide, the second Fabry-Perot resonator having a predetermined thickness determining the second series of at least one optical wavelength transmitted through the second Fabry-Perot resonator from the first waveguide to the third waveguide.

3. An apparatus according to claim 1, wherein the second waveguide comprises an input for receiving a second incoming light signal, the second incoming light signal being within the first series of at least one optical wavelength, whereby the second incoming light signal is coupled out of the second waveguide to the first waveguide.

4. An apparatus according to claim 1, wherein:

the first waveguide has a core and two mirrors which are a first high reflectivity mirror and the first partial reflectivity mirror, the first high reflectivity mirror including three cladding layers, the first partial reflectivity mirror including one cladding layer;

the second waveguide has a core and two mirrors which are a second high reflectivity mirror and the second partial reflectivity mirror which is the Fabry-Perot resonator, the second high reflectivity mirror including three cladding layers, the cores of the waveguides having a similar thickness $D_{co}$ and a similar refractive index $n_{co}$ which is different from the one $n_{c1}$ of the cladding layers of the high reflectivity mirrors and of the first partial reflectivity mirror;

the distance between two of the cladding layers that are adjacent is $D_{co}/2$;

the distance between the Fabry-Perot resonator and the adjacent cladding layer is $D_{co}/2$;

the cladding layers of the high reflectivity mirrors and of the first partial reflectivity mirror each has a similar thickness $D_{cl1}$ determined by the following first equation:

$$D_{cl1} = \frac{(2N_1 - 1)\lambda_c}{\sqrt[4]{n_{c1}^2 - n_{co}^2 + (\lambda_c/2D_{co})^2}}$$

where $\lambda_c$ is a communication bandwidth central wavelength determined by operating condition chosen by a user, and $N_1$ is an antiresonance condition order determined by the operating condition;

the Fabry-Perot resonator has a thickness $D_{cl2}$ is determined by the following second equation:

$$D_{cl2} = \frac{(2N_2 - 1)\lambda_d}{\sqrt[4]{n_{cl}^2 - n_{co}^2 + (\lambda_d/2D_{co})^2}}$$

where $N_2$ is calculated by means of the following third equation:

$$N_2 = \frac{\lambda_d}{\Delta\lambda}$$

where $\lambda_d$ is a wavelength chosen by the user and to be transmitted through the Fabry-Perot resonator, and $\Delta\lambda$ is the free spectral range of the apparatus and it is determined by the operating condition.

5. An apparatus according to claim 4, wherein $D_{co}$ is 8 µm, $n_{co}$ is 1.52, $n_{c1}$ is 1.57, $\Delta\lambda$ is 11.94 nm, $N_1$ is 1, $\lambda_d$ is 633 nm and $\lambda_c$ is 633 nm so that $D_{cl1}$ is 0.436 µm and $D_{cl2}$ is 42.1 µm.

6. An apparatus according to claim 1, wherein:

the first waveguide has a core and two mirrors which are a first high reflectivity mirror and the first partial reflectivity mirror, the first high reflectivity mirror including three cladding layers, the first partial reflectivity mirror including one cladding layer;

the second waveguide has a core and two mirrors which are a second high reflectivity mirror and the second partial reflectivity mirror which is the Fabry-Perot resonator, the second high reflectivity mirror including three cladding layers, the cores of the waveguides having thicknesses that are slightly asymmetric in that said thicknesses are slightly different.

7. A method for periodically selecting a first series of at least one optical wavelength from a first incoming light signal, comprising steps of:

receiving the incoming light signal by means of an input of a first waveguide, the first waveguide having guiding mirrors for guiding the incoming light signal, one of the guiding mirrors being a first partial reflectivity mirror;

guiding an outputting light signal containing the first series of at least one wavelength by means of a second waveguide having guiding mirrors; and providing a first Fabry-Perot resonator adjacent to the first partial reflectivity mirror, and forming one of the guiding mirrors of the second waveguide, the Fabry-Perot resonator being a second partial reflectivity mirror for the second waveguide, the Fabry-Perot resonator having a predetermined thickness determining the first series of at least one optical wavelength transmitted through the Fabry-Perot resonator from the first waveguide to the second waveguide.

8. A method according to claim 7, wherein the first waveguide having a second of its guiding mirrors that is a third partial reflectivity mirror, the method further comprising steps of:

guiding an outputting light signal containing a second series of at least one wavelength by means of a third waveguide having guiding mirrors; and providing a second Fabry-Perot resonator adjacent to the third partial reflectivity mirror, and forming one of the guiding mirrors of the third waveguide, the second Fabry-Perot resonator being a fourth partial reflectivity mirror for the third waveguide, the second Fabry-Perot resonator having a predetermined thickness determining the second series of at least one optical wavelength transmitted through the second Fabry-Perot resonator from the first waveguide to the third waveguide.

9. A method according to claim 7, further comprising step of receiving a second incoming light signal by means of an input of the second waveguide, the second incoming light signal being within the first series of at least one optical wavelength, whereby the second incoming light signal is coupled out of the second waveguide to the first waveguide.

10. A method according to claim 7, wherein:
 the first waveguide has a core and two mirrors which are a first high reflectivity mirror and the first partial reflectivity mirror, the first high reflectivity mirror including three cladding layers, the first partial reflectivity mirror including one cladding layer;
 the second waveguide has a core and two mirrors which are a second high reflectivity mirror and the second partial reflectivity mirror which is the Fabry-Perot resonator, the second high reflectivity mirror including three cladding layers, the cores of the waveguides having a similar thickness $D_{co}$ and a similar refractive index $n_{co}$ which is different from the one $n_{cl}$ of the cladding layers of the high reflectivity mirrors and of the first partial reflectivity mirror;
 the distance between two of the cladding layers that are adjacent is $D_{co}/2$;
 the distance between the Fabry-Perot resonator and the adjacent cladding layer is $D_{co}/2$; and
 the cladding layers of the high reflectivity mirrors and of the first partial reflectivity mirror each has a similar thickness $D_{cl1}$;

the method further comprising steps of:

determining the thickness $D_{cl1}$ by the following first equation:

$$D_{cl1} = \frac{(2N_1 - 1)\lambda_c}{\sqrt[4]{n_{cl}^2 - n_{co}^2 + (\lambda_c/2D_{co})^2}}$$

where $\lambda_c$ is a communication bandwidth central wavelength determined by operating condition chosen by a user, and $N_1$ is an antiresonance condition order determined by the operating condition; and determining a thickness $D_{cl2}$ of the Fabry-Perot resonator by the following second equation:

$$D_{cl2} = \frac{(2N_2 - 1)\lambda_d}{\sqrt[4]{n_{cl}^2 - n_{co}^2 + (\lambda_d/2D_{co})^2}}$$

where $N_2$ is calculated by means of the following third equation:

$$N_2 = \frac{\lambda_d}{\Delta\lambda}$$

where $\lambda_d$ is a wavelength chosen by the user and to be transmitted through the Fabry-Perot resonator, and $\Delta\lambda$ is the free spectral range and is determined by the operating condition.

* * * * *